United States Patent [19]

Vanderstegen-Drake

[11] 3,768,324

[45] Oct. 30, 1973

[54] AUTOMATIC BELT TENSIONING DEVICE

[75] Inventor: Stamford Robert Francis Vanderstegen-Drake, Newbury, England

[73] Assignee: Plenty & Son Limited, Berkshire, England

[22] Filed: Mar. 7, 1972

[21] Appl. No.: 232,476

[30] Foreign Application Priority Data
Mar. 11, 1971 Great Britain............... 6,591/71

[52] U.S. Cl. ........................................ 74/242.15 R
[51] Int. Cl. ................................................ F16h 7/10
[58] Field of Search ............................ 74/242.15 R

[56] References Cited
UNITED STATES PATENTS

| 3,563,196 | 2/1971 | Nicolay | 74/242.15 R X |
|---|---|---|---|
| 2,927,571 | 3/1960 | Kamlukin | 74/242.15 R X |
| 2,910,890 | 11/1959 | Mellinger | 74/242.15 R X |
| 3,027,736 | 4/1962 | Smith | 74/242.15 R X |
| 3,702,570 | 11/1972 | Stikkers | 74/242.15 R |

Primary Examiner—Leonard H. Gerin
Attorney—Arthur E. Dowell, Jr. et al.

[57] ABSTRACT

An automatic belt-tensioning assembly for drive systems including a motor driving another device by means of a belt and pulleys, in which the motor and the driven device are mounted for relative movement, and an adjustable spring assembly urges them apart so as to provide a pre-settable tension in the belt.

3 Claims, 1 Drawing Figure

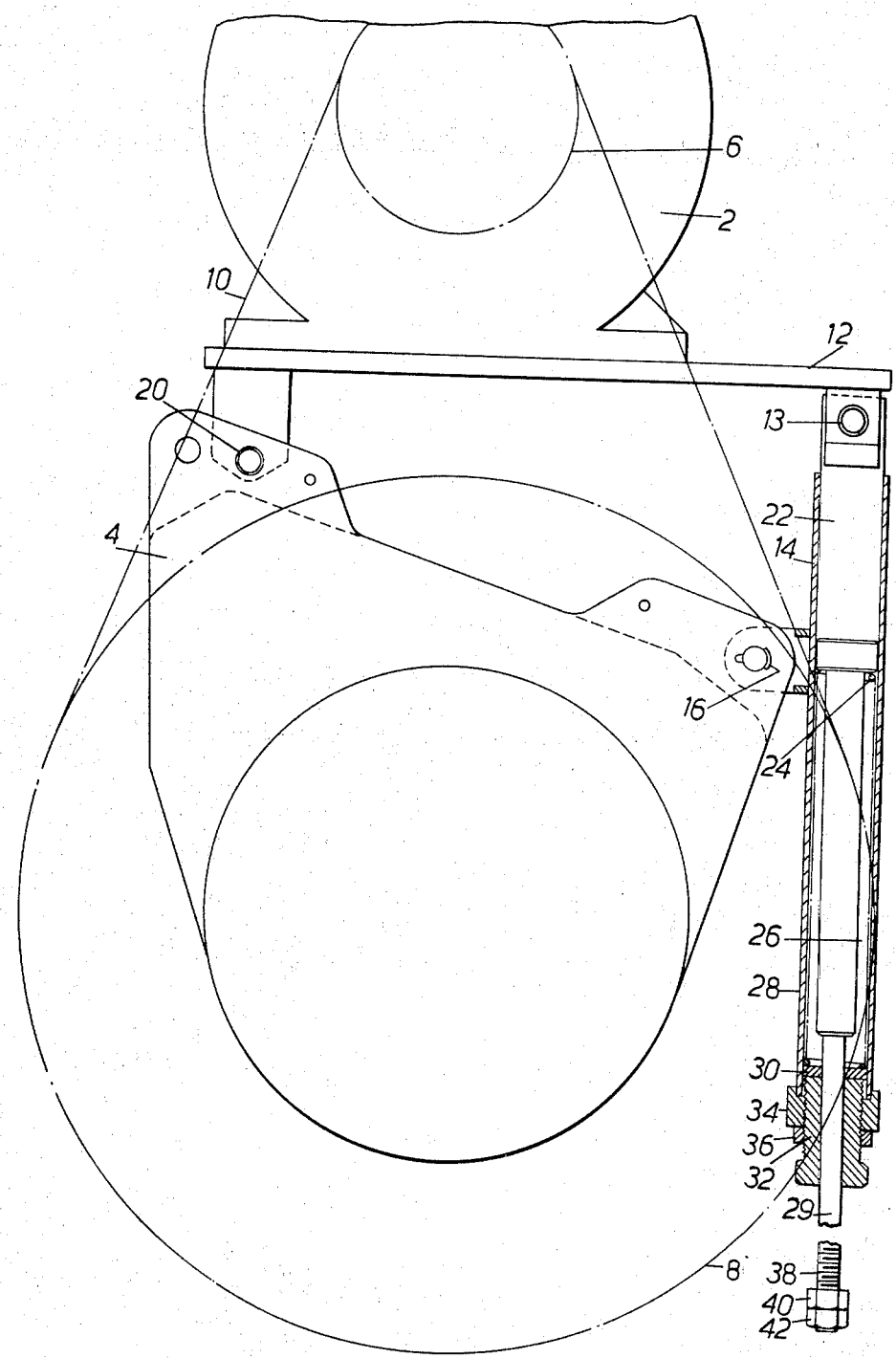

AUTOMATIC BELT TENSIONING DEVICE

This invention relates to belt drives and particularly to tensioning devices for the belts of belt drives.

Belt tensioning devices of the type which incorporate a roller or the like biased to bear against the belt are capable of slight movement to take up the slack but it is difficult with such an arrangement to ensure a reasonably constant tension. Furthermore, such devices impart undesirable reverse bending to the belt.

An automatic belt tensioning assembly according to the invention, for drive systems which include a motor driving another device by means of a belt and pulleys, comprises mounting means for the motor or driven device which is adapted to move relative to the driven device or motor respectively and a resilient means connected to the mounting means and urging it in a direction to tension the belt.

According to a preferred feature of the invention the mounting means carrying the motor or driven device is additionally connected to the driven device or motor, respectively, by means of a pivoting joint, or coaxial pivoting joints, parallel to the motor-pulley shaft, and the mounting means is positioned on the resilient means, above the driven device or motor, as the case may be. The resilient means is preferably a spring mounted in an adjustable housing which permits its tension to be preadjusted. This tension once set remains constant for that particular drive assembly, and provides an initial tension in the belt when the motor is not running.

The pivot point is preferably so located that when running the torque of the motor creates the tension required, in the tight and slack sides of the belt, to transmit the power required by the load. The pivot is preferably positioned near the driving side of the belt with its axis passing between the sides of the belt. This helps to ensure that the 'slack' side of the belt is kept at a reasonable tension when the motor is running.

The couples acting on the assembly due to the turning moments of the mass of the motor, the running tension in each side of the belt and the force in the spring are in balance and remain so as the belts wear and stretch.

A preferred embodiment of the invention will now be described with reference to the accompanying drawing, which is an end elevational view of a belt tensioning assembly according to the invention.

Referring to the drawing, the motor is indicated at 2 and the driven devices at 4. The motor-pulley 6 drives the driven pulley 8 by means of belt 10 and the motor is mounted above the driven device on platform 12 constituting the movable mounting means. Platform 12 is mounted via pivot 1 on the spring assembly 14 which is pivoted to the device 4 at 16. The platform is also connected directly to the driven device by pivot 20 which is parallel to the motor shaft.

The spring assembly 14 includes a piston 22, to which the platform is attached through pivot 18, having an annular shoulder 24 which rests on a spring 26. The piston and spring are located within a cylinder 28, to which the pivot 16 is fixed, and a piston rod 29 extends through the spring 26 and out of the lower end of the cylinder. The lower end of the spring 26 rests on washer 30 which is supported by a piston rod guide 32. The guide 32 is threaded and engages in a cylinder closure member 34, in which it can be screwed up and down to set the tension in the spring, and can also be locked in the desired position, by means of a lock-nut 36. The rod 29 terminates in a threaded portion 38 and nuts 40 and 42 are locked against one another on this portion so as to form a stop, limiting the upward movement of the piston.

The position of the pivot 20 is important to the operation of the device, and it is chosen so that in operation when the belts are at the correct tension, the moments of the various couples acting on the assembly are balanced out. The embodiment shown in the drawing is arranged for clockwise rotation of the motor pulley so that in operation the tension in the left-hand side of the belt is considerably larger than that in the right-hand side. This is compensated for by positioning the pivot 20 much nearer to the left-hand side so that the moments of these tensions about the pivot are approximately in balance. The required tension in the belt is set by adjusting the guide 32 of the spring assembly. The clockwise moments due to the tension in the slack side of the belt plus that due to the mass of the motor, platform and drive pulley are then balanced by the anticlockwise moments due to the tension in the tight side of the belt, and the spring assembly. As the belt stretches, the motor platform, urged by the spring and the torque of the motor, can pivot slightly anticlockwise until the moments again cancel out in the new equilibrium position, so that the belt is always kept in tension.

In this way the tension in the belt is pre-set for the particular combination of motor and load in use and does not require re-setting for the life of the belt, since the tension is kept well within the manufacturer's recommended range.

Although the invention has been described with reference to an arrangement in which the motor is mounted on a platform above the driven device it will be appreciated that the arrangement could be reversed, depending on the relative sizes of the devices.

I claim:
1. A belt drive assembly comprising
   a driving pulley,
   a driven pulley,
   and a belt connecting the said pulleys,
   mounting means for each of the said pulleys
   and resilient means urging the mounting means apart so as to tension the belt,
   a pivotting joint connecting the said mounting means,
   the mounting means for the driving pulley comprising
      a platform,
      a motor mounted on said platform
      and an output shaft for the said motor,
      the driving pulley being mounted on the said shaft,
   the mounting means for the driven pulley comprising
      a driven device,
      and an input shaft for the driven device, the driven pulley being mounted on the said shaft,
   in which the resilient means comprises
      a cylindrical housing pivotally connected to one of the said mounting means,
      a spring contained in the said housing,
      a piston movable in the said housing to compress said spring
      and a pivotting joint between said piston and the other of said mounting means.

2. A belt drive assembly according to claim 1 in which the platform for the motor is mounted above the driven device.

3. A belt drive assembly comprising
a driving pulley,
a driven pulley,
and a belt connecting the said pulleys,
mounting means for each of the said pulleys
resilient means urging the mounting means apart so as to tension the belt,
a pivotting joint connecting the said mounting means,
the mounting means for the driving pulley comprising
a platform,
a motor mounted on said platform,
and an output shaft for the said motor, the driving pulley being mounted on the said shaft,
the mounting means for the driven pulley comprising
a driven device,
and an input shaft for the driven device,
the driven pulley being mounted on the said shaft, in which the resilient means comprises,
a cylindrical housing pivotally connected to one of the said mounting means,
a spring contained in the said housing,
a piston movable in the said housing to compress said spring,
a pivotting joint between said piston and said platform,
and spring adjusting means on the opposite end of said cylindrical housing comprising a threaded plug and a lock-nut on the said plug whereby the internal length of the cylindrical housing and thus the tension of the spring can be adjusted by rotating the plug and locking it in the required position.

* * * * *